United States Patent
Sharma et al.

(10) Patent No.: US 12,262,208 B2
(45) Date of Patent: Mar. 25, 2025

(54) METHODS, SYSTEMS, AND COMPUTER READABLE MEDIA FOR PERFORMING LOCATION AND VELOCITY CHECK AT SECURITY EDGE PROTECTION PROXY (SEPP) TO AVOID SPOOFING

(71) Applicant: Oracle International Corporation, Redwood Shores, CA (US)

(72) Inventors: Ashish Jyoti Sharma, New Delhi (IN); Jay Rajput, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 179 days.

(21) Appl. No.: 18/135,105

(22) Filed: Apr. 14, 2023

(65) Prior Publication Data
US 2024/0349057 A1 Oct. 17, 2024

(51) Int. Cl.
*H04W 12/122* (2021.01)
*H04W 12/06* (2021.01)
*H04W 12/104* (2021.01)

(52) U.S. Cl.
CPC ......... *H04W 12/122* (2021.01); *H04W 12/06* (2013.01); *H04W 12/104* (2021.01)

(58) Field of Classification Search
CPC . H04W 12/122; H04W 12/06; H04W 12/104; H04W 12/61; H04W 12/63
See application file for complete search history.

(56) References Cited

U.S. PATENT DOCUMENTS

| 10,470,154 B2 | 11/2019 | Chellamani et al. |
| 10,834,045 B2 | 11/2020 | Mahalank et al. |

(Continued)

OTHER PUBLICATIONS

Hailu et al., "Hybrid paging and location tracking scheme for inactive 5G UEs", Jun. 2017, European Conference on Networks and Communications, pp. 1-6 (Year: 2017).*

(Continued)

*Primary Examiner* — Kenneth W Chang
(74) *Attorney, Agent, or Firm* — Jenkins, Taylor & Hunt, P.A.

(57) ABSTRACT

A method for performing a location and velocity check at an SEPP to protect against a spoofing attack includes receiving an SBI request message relating to authentication of UE. The method further includes querying a database NF to obtain previous authentication information for the UE, the previous authentication information including a previous network identifier and a previous authentication time for the UE. The method further includes receiving a response from the database NF, the response including the previous network identifier and the previous authentication time. The method further includes reading, a current network identifier from the SBI request message, performing, using the current network identifier from the SBI request message, the previous network identifier, the previous authentication time, and a time of receipt by the SEPP of the SBI request message, a location and velocity check for the UE, and performing a network security action for the SBI request message based on results of the location and velocity check.

20 Claims, 9 Drawing Sheets

(56) References Cited

U.S. PATENT DOCUMENTS

| | | | |
|---|---|---|---|
| 2006/0276226 A1* | 12/2006 | Jiang | H04W 8/183 |
| | | | 455/433 |
| 2010/0313024 A1* | 12/2010 | Weniger | H04L 63/0823 |
| | | | 380/278 |
| 2011/0014939 A1* | 1/2011 | Ravishankar | H04W 48/04 |
| | | | 455/515 |
| 2011/0170532 A1* | 7/2011 | Tchepnda | H04W 12/06 |
| | | | 370/338 |
| 2022/0070674 A1 | 3/2022 | Russell | |
| 2022/0159445 A1 | 5/2022 | Rajavelu | |
| 2022/0201489 A1 | 6/2022 | Mahalank et al. | |
| 2022/0272541 A1* | 8/2022 | Rajput | H04W 64/00 |
| 2022/0369091 A1 | 11/2022 | Nair et al. | |
| 2024/0349059 A1 | 10/2024 | Sharma et al. | |

OTHER PUBLICATIONS

Yakhlef et al., "Simulation of Location Management Strategies of Timer, Location Area, and Movement Based Update/Paging for Wireless Networks", May 2013, The International Conference on Technological Advances in Electrical, Electronics and Computer Engineering, pp. 595-599 (Year: 2013).*

Commonly-Assigned, co-pending U.S. Appl. No. 18/135,108 for "Methods, Systems, and Computer Readable Media for Performing Location and Velocity Check at Security Edge Protection Proxy (SEPP) Using Service Communication Proxy (SCP)" (Unpublished, filed Apr. 14, 2023).

5G Interconnect Security, GSMA FS-36, Version 2.0, Jun. 3, 2021.

3rd Generation Partnership Project; Technical Specification Group Services and System Aspects; Security architecture and procedures for 5G system (Release 18) 3GPP TS 33.501 V18.0.0 (Dec. 2022).

3rd Generation Partnership Project; Technical Specification Group Core Network and Terminals; 5G System; Principles and Guidelines for Services Definition; Stage 3 (Release 18) 3GPP TS 29.501 V18.0.0 (Dec. 2022).

3rd Generation Partnership Project; Technical Specification Group Core Network and Terminals; 5G System; Technical Realization of Service Based Architecture; Stage 3 (Release 18) 3GPP TS 29.500 V18.0.0 (Dec. 2022).

3rd Generation Partnership Project; Technical Specification Group Core Network and Terminals; 5G System; Network Function Repository Services; Stage 3 (Release 18) 3GPP TS 29.510 V18.1.0 (Dec. 2022).

3rd Generation Partnership Project; Technical Specification Group Services and System Aspects; Procedures for the 5G System (5GS); Stage 2 (Release 17) 3GPP TS 23.502 V17.7.0 (Dec. 2022).

3rd Generation Partnership Project; Technical Specification Group Services and System Aspects for the 5G System (5GS); Stage 2; (Release 17) 3GPP TS 23.501 V17.7.0 (Dec. 2022).

"3rd Generation Partnership Project; Technical Specification Group Services and System Aspects; Security architecture and procedures for 5G system (Release 18)" 3GPP TS 33.501 V18.1.0, pp. 1-293 (Mar. 2023).

* cited by examiner

METHODS, SYSTEMS, AND COMPUTER READABLE MEDIA FOR PERFORMING LOCATION AND VELOCITY CHECK AT SECURITY EDGE PROTECTION PROXY (SEPP) TO AVOID SPOOFING

TECHNICAL FIELD

The subject matter described herein relates to protecting against spoofing attacks in an operator's network. More particularly, the subject matter described herein relates to performing a location and velocity check at the SEPP to avoid spoofing.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for application programming interface (API) messages that are transmitted between PLMNs.

One problem in 5G and other types of networks is that network operators do not have an effective mechanism for validating incoming service-based interface (SBI) request messages relating to authentication of user equipment (UEs) at the SEPP. For example, the home network of the subscriber may receive an authentication request for a UE that indicates that the UE is currently attached to a network in another country. The UE may have previously registered as being attached to the home network a short time before the new authentication request arrives. The authentication request indicating that the UE is currently attached to a network in another country may be fraudulent and should be screened. The authentication server function (AUSF) is responsible for providing some of the information relating to UE authentication. However, requiring the AUSF to additionally perform screening of authentication requests can be burdensome on the AUSF.

Accordingly, there exists a need for improved methods, systems, and computer readable media for performing a location and velocity check for messaging relating to UEs.

SUMMARY

A method for performing a location and velocity check at a security edge protection proxy (SEPP) to protect against a spoofing attack is provided. The method includes receiving, at an SEPP, a service-based interface (SBI) request message relating to authentication of a user equipment (UE). The method includes querying, by the SEPP, a database network function (NF) to obtain previous authentication information for the UE, the previous authentication information including a previous network identifier and a previous authentication time for the UE. The method further includes receiving, at the SEPP, a response from the database NF, the response including the previous network identifier and the previous authentication time. The method further includes reading, by the SEPP, a current network identifier from the SBI request message. The method further includes performing, by the SEPP and using the current network identifier from the SBI request message, the previous network identifier, the previous authentication time, and a time of receipt by the SEPP of the SBI request message, a location and velocity check for the UE. The method further includes performing a network security action for the SBI request message based on results of the location and velocity check.

According to another aspect of the subject matter described herein, receiving the SBI request message relating to authentication of a UE includes receiving an Nausf_UEauthentication message.

According to another aspect of the subject matter described herein, querying the database NF includes transmitting an authentication information query message to a unified data repository (UDR) using an application programming interface (API) provided by the UDR for previous authentication information queries from the SEPP.

According to another aspect of the subject matter described herein, querying the database NF includes transmitting an authentication information query message to a unified data management function (UDM) using an application programming interface (API) provided by the UDM for previous authentication information queries from the SEPP.

According to another aspect of the subject matter described herein, the method for performing location and velocity checks includes, at the UDM, receiving the authentication information query message and querying a unified data repository (UDR) for the previous authentication information for the UE.

According to another aspect of the subject matter described herein, the method for performing location and velocity checks includes, at the UDM, determining that the authentication information query message includes a subscription concealed identifier (SUCI), and, in response, prior to querying the UDR, invoking a subscription identifier de-concealing function (SIDF) to de-conceal the SUCI.

According to another aspect of the subject matter described herein, reading the current network identifier from the SBI request message includes reading a public land mobile network (PLMN) ID from the SBI request message.

According to another aspect of the subject matter described herein, performing the location and velocity check includes determining whether a distance between a previous network identified by the previous network identifier and a current network identified by the current network identifier could have been traveled by the UE in light of a time difference between the previous authentication time and the time of receipt of the SBI request message.

According to another aspect of the subject matter described herein, performing the network security action includes blocking the SBI request message in response to determining that the distance could not have been traveled by the UE.

According to another aspect of the subject matter described herein, performing the network security action includes blocking future messages from a sender of the SBI request message in response to determining that the distance could not have been traveled by the UE.

According to another aspect of the subject matter described herein, a system for performing a location and velocity check at a security edge protection proxy (SEPP) to protect against a spoofing attack is provided. The system includes an SEPP including at least one processor and a memory. The system further includes a user equipment (UE)-authentication-based location and velocity checker implemented by the at least one processor for receiving a service-based interface (SBI) request message relating to authentication of a UE, querying a database network function (NF) to obtain previous authentication information for the UE, the previous authentication information including a previous network identifier and a previous authentication time for the UE, the UE-authentication-based location and velocity checker for receiving a response from the database NF, the response including the previous network identifier and the previous authentication time, reading, by the SEPP, a current network identifier from the SBI request message, performing, using the current network identifier from the SBI request message, the previous network identifier, the previous authentication time, and a time of receipt by the SEPP of the SBI request message, a location and velocity check for the UE, and performing a network security action for the SBI request message based on results of the location and velocity check.

According to another aspect of the subject matter described herein, the SBI request message relating to authentication of a UE includes an Nausf_UEauthentication message.

According to another aspect of the subject matter described herein, in querying the database NF, the UE-authentication-based location and velocity checker is configured to transmit an authentication information query message to a unified data repository (UDR) using an application programming interface (API) provided by the UDR for previous authentication information queries from the SEPP.

According to another aspect of the subject matter described herein, in querying the database NF, the UE-authentication-based location and velocity checker is configured to transmit an authentication information query message to a unified data management function (UDM) using an application programming interface (API) provided by the UDM for previous authentication information queries from the SEPP.

According to another aspect of the subject matter described herein, the UDM queries a unified data repository (UDR) for the previous authentication information for the UE, the UDR provides the previous authentication information for the UE to the UDM, and the response received by the SEPP is from the UDM.

According to another aspect of the subject matter described herein, the current network identifier includes a public land mobile network (PLMN) ID.

According to another aspect of the subject matter described herein, in performing the location and velocity check, the UE-authentication-based location and velocity checker is configured to determine whether a distance between a previous network identified by the previous network identifier and a current network identified by the current network identifier could have been traveled by the UE in light of a time difference between the previous authentication time and the time of receipt of the SBI request message.

According to another aspect of the subject matter described herein, the network security action includes blocking the SBI request message in response to determining that the distance could not have been traveled by the UE.

According to another aspect of the subject matter described herein, the network security action includes blocking future messages from a sender of the SBI request message in response to determining that the distance could not have been traveled by the UE.

According to another aspect of the subject matter described herein, a non-transitory computer readable medium having stored thereon executable instructions that when executed by a processor of a computer control the computer to perform steps is provided. The steps include receiving, at a security edge protection proxy (SEPP), a service-based interface (SBI) request message relating to authentication of a user equipment (UE). The steps further include querying, by the SEPP, a database network function (NF) to obtain previous authentication information for the UE, the previous authentication information including a previous network identifier and a previous authentication time for the UE. The steps further include receiving, at the SEPP, a response from the database NF, the response including the previous network identifier and the previous authentication time. The steps further include reading, by the SEPP, a current network identifier from the SBI request message. The steps further include performing, by the SEPP and using the current network identifier from the SBI request message, the previous network identifier, the previous authentication time, and a time of receipt by the SEPP of the SBI request message, a location and velocity check for the UE. The steps further include performing a network security action for the SBI request message based on results of the location and velocity check.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
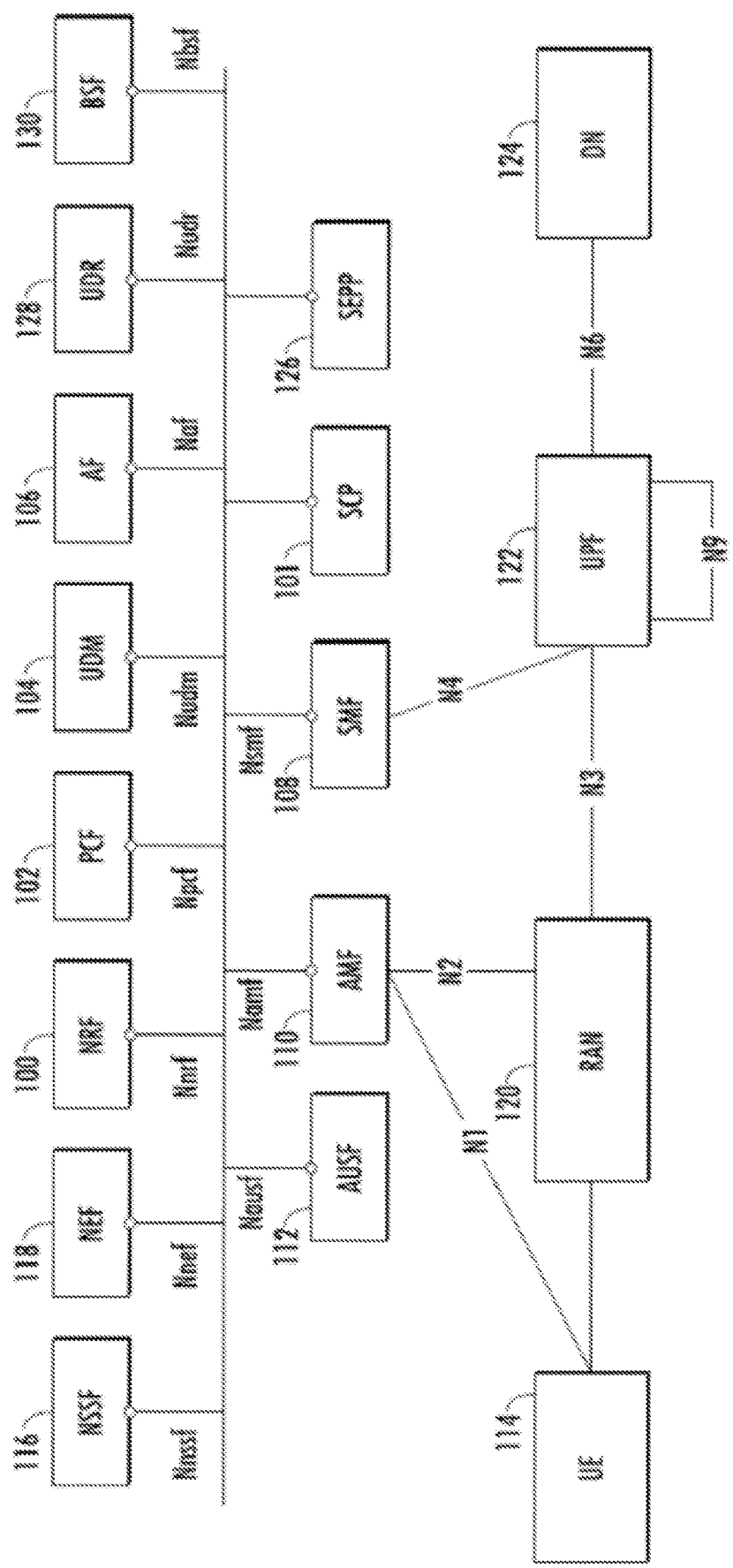
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. RAN 120 may be accessed using a gNB (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. FIG. 1 also illustrates a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription and authentication data for UEs. A binding support function (BSF) 130 manages bindings between PDU sessions and PCFs.

As stated above, one problem that can occur in 5G and other types of networks is that existing location and velocity and/or security checks at an SEPP are inadequate to protect against security attacks, such as spoofing attacks. There is a need to check when an authentication request is received from a foreign network that the UE has in fact traveled to the network. The SEPP can be used to determine whether an authentication request apparently originating from a foreign network is appropriate in light of whether the UE could have traveled to that network within the time since the last UE authentication. For example, a UE may authenticate from within a home network in the United States at the present time. The SEPP may also receive an authentication request from the UE originating from France, also at the present time. The home network should have an efficient mechanism for performing location and velocity checks for UE authentication requests that detects anomalies and blocks false UE authentication requests from entering the home network. GSMA FS-36 only states that time and velocity checks shall be done, however there is no clear guideline as to how to achieve location and velocity checks for authentication requests in the home network.

Figure 2:
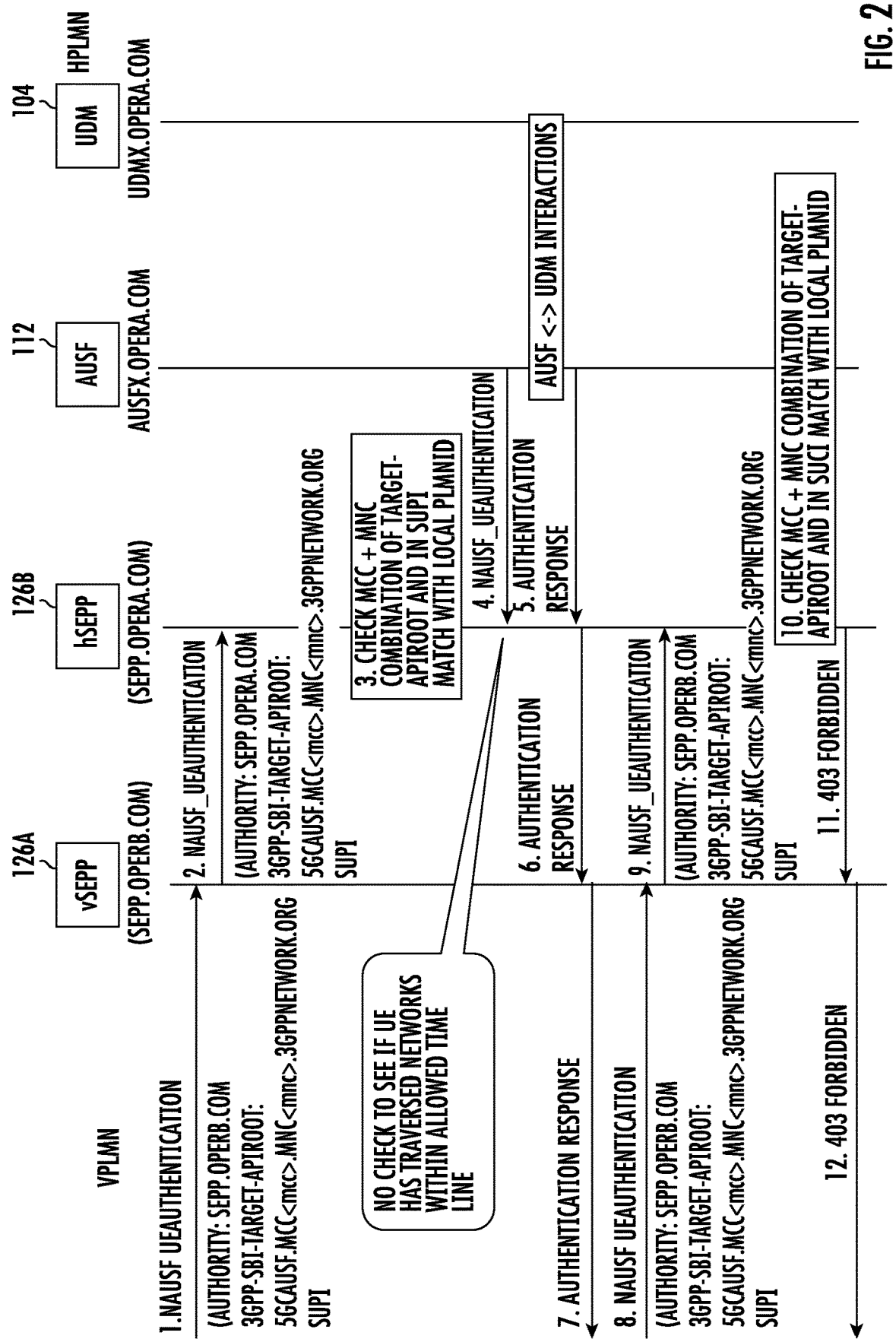
FIG. 2 is a message flow diagram illustrating authentication messaging without a location and velocity check at the SEPP.

FIG. 2 is a message flow diagram illustrating authentication messaging without a location and velocity check at the SEPP. Referring to FIG. 2, in step 1, vSEPP 126A receives an Nausf_UEAuthentication_Authenticate request message originating from either a legitimate AMF serving the UE or from a hacker seeking to spoof the identity of the UE. In step 2, vSEPP 126A forwards the Nausf_UEAuthentication_Authenticate request message to hSEPP 126B. In step 3, hSEPP 126B checks the mobile country code (MCC) and mobile network code (MNC) from the targetApiroot header and the subscription permanent identifier (SUPI) of the Nausf_UEAuthentication_Authenticate request message to determine whether these terms match with the local PLMN ID. In this example, it is determined that the identifiers match the local PLMN ID. It should be noted that the verification in step 3 is optional and may be omitted without departing from the scope of the subject matter described herein. If the parameters being verified in step 3 match the local PLMN ID or if step 3 is omitted, control proceeds to step 4 where hSEPP 126B forwards the Nausf_UEAuthentication_Authenticate request message to AUSF 112. There is no check to see if the UE has traversed networks within an allowed timeline. The Nausf_UEAuthentication_Authenticate request message passes through SCP 100, which forwards the message to AUSF 112. AUSF 112 signals with UDM 104 to obtain authentication information for the UE. In step 5, AUSF 112 generates and sends an Nausf_UEAuthentication_Authenticate response to hSEPP 126B. In step 6, hSEPP 126B forwards the authentication response to vSEPP 126A. In step 7, vSEPP 126A forwards the authentication response to the sender.

In step 8, vSEPP 126A receives another Nausf_UEAuthentication_Authenticate request message originating from either a legitimate AMF serving the UE or from a hacker seeking to spoof the identity of the UE. In step 9, vSEPP 126A forwards the Nausf_UEAuthentication_Authenticate request message to hSEPP 126B. In step 10, hSEPP 126B checks the MCC and MNC from the targetApiroot header and the SUPI of the Nausf_UEAuthentication_Authenticate request message to determine whether these terms match with the local PLMN ID. In this example, it is determined that the identifiers do not match the local PLMN ID. Accordingly, in step 11, hSEPP 126B transmits a 403 Forbidden message to vSEPP 126A. In step 12, vSEPP 126A transmits the 403 Forbidden message to the originator of the Nausf_UEAuthentication_Authenticate request message.

Even though checking the MCC, MNC, and SUPI for a local PLMN ID provides some security, because there is no security check to determine whether the Nausf_UEAuthentication_Authenticate request message to determine whether the location information associated with the request is reasonable with regard to possible UE movement since the last authentication request, a hacker can make such a request and gain access subscriber data in the HPLMN.

To reduce the likelihood of successful spoofing attacks based on messaging concerning UE authentication or registration, hSEPP 126B may perform a location and velocity check for authentication messaging concerning a UE using information obtained from a database network function, such as UDR. Using information from a UDR to perform location and velocity checks is advantageous because UDR stores authentication information for a UE. The subject matter described herein adds API to the UDR through which hSEPP 126B can request and obtain previous authentication information regarding a subscriber. In cases where the SEPP communicates with the UDR via the UDM, the UDM also includes an API through which the SEPP can request authentication information for a UE.

When authentication of a UE triggers an authentication request to be sent to the home network, the home SEPP queries the UDR to retrieve a last authentication time and serving network name for the UE. The SEPP then checks the received ingress request message to determine whether the UE activity (e.g., authentication activity) is within allowed timelines based on the authentication time and serving network name. If the activity is within allowed timelines, the SEPP may allow the message to pass. If the activity is not within allowed timelines, the SEPP may perform a network security action, such as blocking the message, blocking all messages from the sender, and/or alerting the network operator. For example, if the SEPP determines that the distance traveled by the UE indicated by a current authentication request message and a last authentication time exceeds an operator-defined threshold given the time between the current message and the last authentication time and the distance between the current UE location and the location associated with the last authentication time, the SEPP may discard the message.

Figure 3:
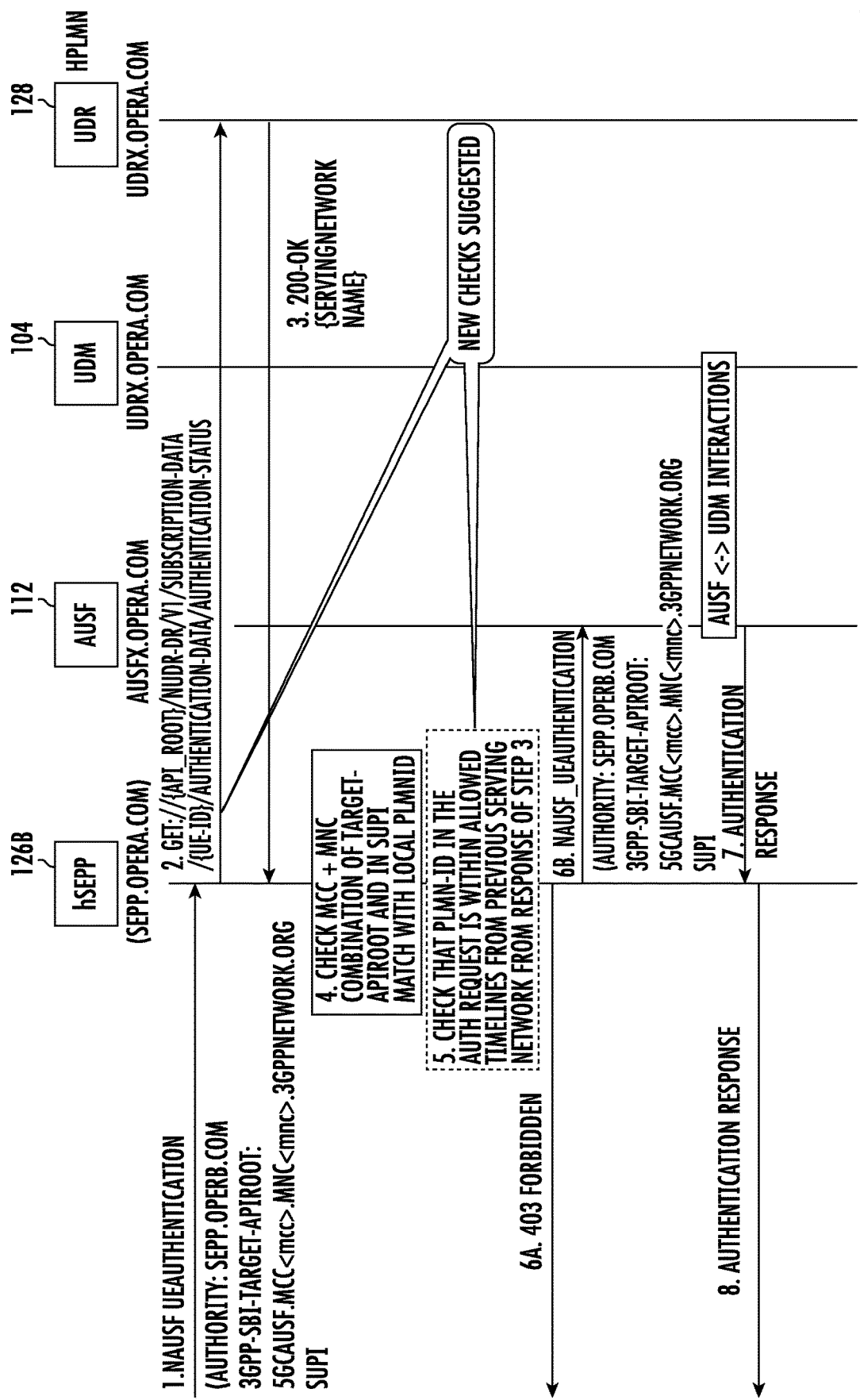
FIG. 3 is a message flow diagram illustrating exemplary messages exchanged where the SEPP signals with the UDR to obtain information for a location and velocity check.

FIG. 3 is a message flow diagram illustrating authentication messaging and a location and velocity check at the SEPP using previous authentication information obtained from a UDR. Referring to FIG. 3 in step 1, hSEPP 126B receives an Nausf_UEAuthentication_Authenticate request message. In step 2, hSEPP 126B queries UDR 128 for authentication information, including the last authentication time and corresponding serving network name of the network serving UE at the time of the last authentication. In step 3, UDR 128 responds with the authentication information for the UE. The authentication information includes the last authentication time and the serving network name of the network serving the UE at the time of the last authentication.

In step 4, hSEPP 126B checks the MNC and MCC combination of the targetApiroot header and in the SUPI to determine whether they match with the local PLMN ID. It should be noted that the verification in step 4 is optional and can be omitted without departing from the scope of the subject matter described herein. In this example, it is assumed that the parameters match the local PLMN ID.

In step 5, hSEPP 126B determines whether the authentication message received in step 1 is within an allowed timeline given the authentication information obtained from UDR 128 in step 3. Step 5 may be achieved by computing a distance between the current location of the UE and the location of the last authentication, computing a time difference between the current time and the time of the last authentication, and determining whether the distance is above an operator-defined threshold for the time difference. If the distance is greater than the operator-defined threshold, hSEPP 126B may determine that the message fails the location and velocity check. If the distance is less than the operator-defined threshold, hSEPP 126B may determine that the message passes the location and velocity check.

In step 6A, if hSEPP 126B determines that the authentication message is not within the allowed timeline, hSEPP 126B blocks the message and sends a response message, such as a 403 Forbidden response, to the originator of the authentication request message. If hSEPP 126B determines that the authentication message is within the allowed timeline, in step 6B, hSEPP 126B sends the message to AUSF 112. AUSF 112 then signals with UDM 104 to obtain authentication information for the UE. In step 7, AUSF 112 sends the authentication response to hSEPP 126B. In step 8, hSEPP 126B sends the authentication response to the originator of the authentication request.

Figure 4:
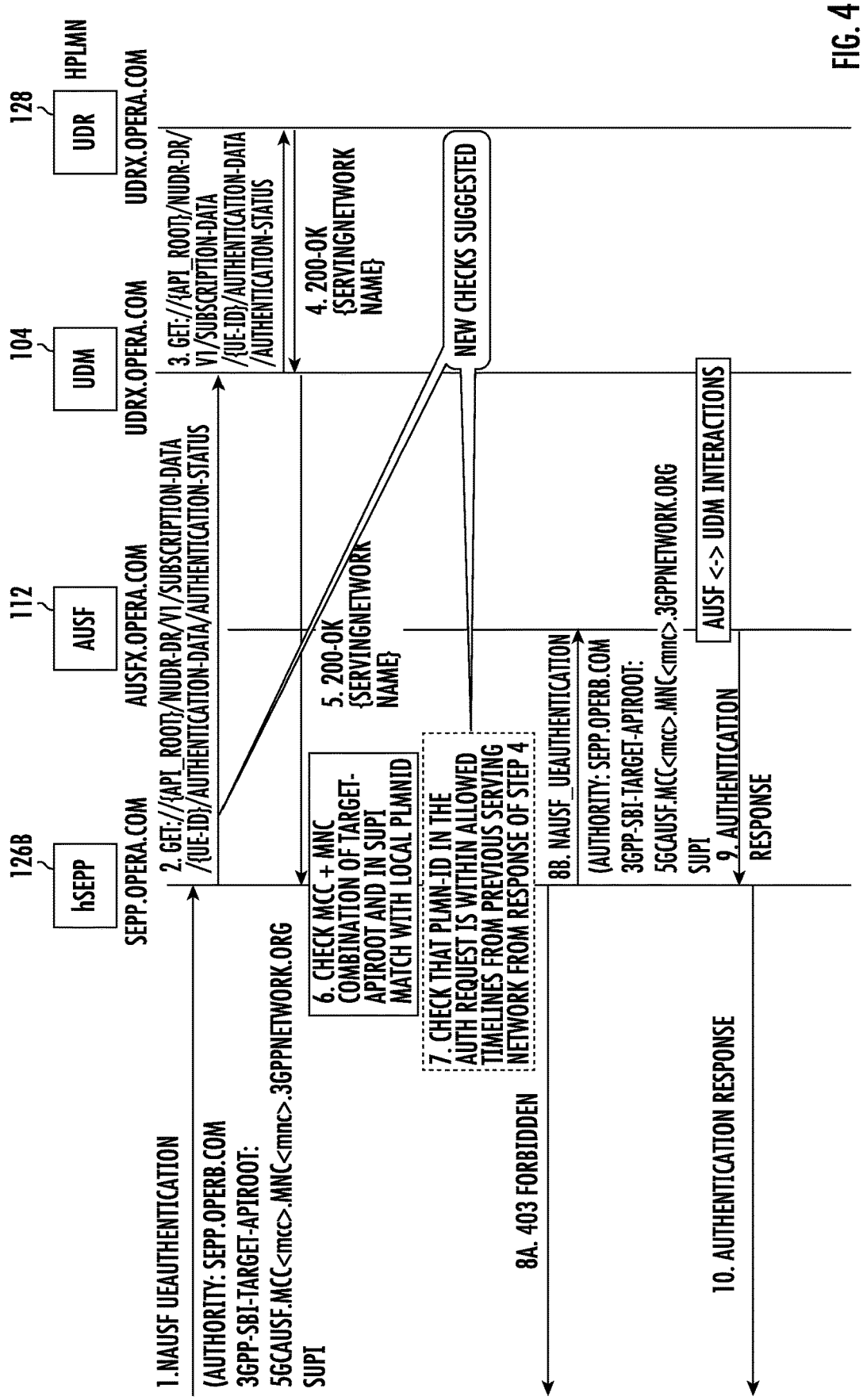
FIG. 4 is a message flow diagram illustrating exemplary messages exchanged where the SEPP signals with the UDM, the UDM signals with the UDR, and the UDR provides prior authentication information to the SEPP via the UDM to allow the SEPP to perform a location and velocity check.

FIG. 4 is a message flow diagram illustrating exemplary messages exchanged where the SEPP signals with the UDM, the UDM signals with the UDR, and the UDR provides prior UE authentication information the SEPP via the UDM to allow the SEPP to perform a location and velocity check. Referring to FIG. 4, in step 1, hSEPP 126B receives an Nausf_UEAuthentication_Authenticate request message. In step 2, hSEPP 126B queries UDM 104 for authentication information. In step 3, UDM 104 queries UDR 128 for authentication information, including the last authentication time and corresponding serving network name of the network serving the UE at the time of the last authentication. In step 4, UDR 128 responds with the authentication information for the UE. The authentication information includes the last authentication time and the serving network name of the network serving the UE at the time of the last authentication. In step 5, UDM 104 provides the authentication information to hSEPP 126B.

In step 6, hSEPP 126B checks the MNC and MCC combination of the targetApiroot header and in the SUPI to determine whether they match with the local PLMN ID. It should be noted that the verification in step 6 is optional and can be omitted without departing from the scope of the subject matter described herein. In this example, it is assumed that the parameters match the local PLMN ID.

In step 7, hSEPP 126B determines whether the authentication message received in step 1 is within an allowed timeline given the authentication information obtained from UDR 128 in step 5. Step 7 may be achieved by computing a distance between the current location of the UE and the location of the last authentication, computing a time difference between the current time and the time of the last authentication, and determining whether the distance is above an operator-defined threshold for the time difference. If the distance is greater than the operator-defined threshold, hSEPP 126B may determine that the message fails the location and velocity check. If the distance is less than the operator-defined threshold, hSEPP 126B may determine that the message passes the location and velocity check.

In step 8A, if hSEPP 126B determines that the authentication message is not within the allowed timeline, hSEPP 126B blocks the message and sends a response message, such as a 403 Forbidden response, to the originator of the authentication request message. If hSEPP 126B determines that the authentication message is within the allowed timeline, in step 8B, hSEPP 126B sends the message to AUSF 112. AUSF 112 then signals with UDM 104 to obtain authentication information for the UE. In step 9, AUSF 112 sends the authentication response to hSEPP 126B. In step 10, hSEPP 126B sends the authentication response to the originator of the authentication request.

Figure 5:
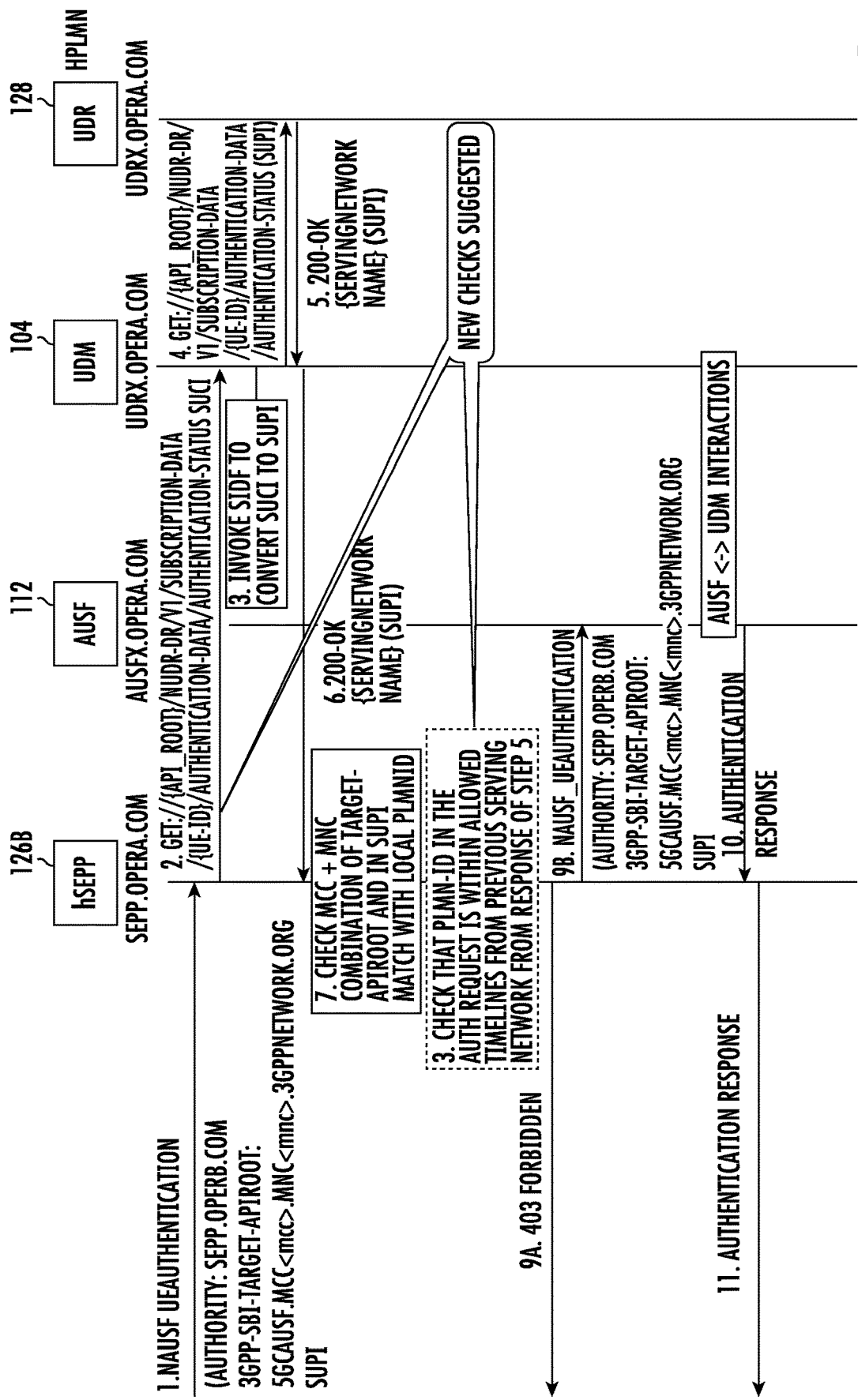
FIG. 5 is a message flow diagram illustrating exemplary messages exchanged where the SEPP signals with the UDM, the UDM implements a subscription identifier de-concealing function (SIDF), the UDM signals with a UDR, and the UDR provides prior authentication information to the SEPP via the UDM to allow the SEPP to perform a location and velocity check.

According to one enhancement of the subject matter described herein, hSEPP 126B may perform the location and velocity check for a UE identified by a SUCI in a received authentication request message. In the examples in FIGS. 3 and 4, the Nausf_UEauthentication request message includes a subscription permanent identifier (SUPI), which is a non-encrypted 3GPP-defined identifier for a UE. In the example in FIG. 5, the Nausf_UEauthentication request message includes a subscription concealed identifier or SUCI. Referring to FIG. 5, in step 1, hSEPP 126B receives an Nausf_UEAuthentication_Authenticate request message. In step 2, hSEPP 126B queries UDM 104 for authentication information. In step 3, UDM 104 invokes the subscription identifier de-concealing function (SIDF), which involves decrypting the SUCI using the home network public key to produce a de-concealed SUCI, from which the SUPI can be determined.

The remaining steps in FIG. 5 are the same as those in FIG. 4. In step 4, UDM 104 queries UDR 128 for authentication information, including the last authentication time and corresponding serving network name of the network serving the UE at the time of the last authentication. In step 5, UDR 128 responds with the authentication information for the UE. The authentication information includes the last authentication time and the serving network name of the network serving the UE at the time of the last authentication. In step 6, UDM 104 provides the authentication information to hSEPP 126B.

In step 7, hSEPP 126B checks the MNC and MCC combination of the targetApiroot header and in the SUPI to determine whether they match with the local PLMN ID. It should be noted that the verification in step 7 is optional and can be omitted without departing from the scope of the subject matter described herein. In this example, it is assumed that the parameters match the local PLMN ID.

In step 8, hSEPP 126B determines whether the authentication message received in step 1 is within an allowed timeline given the authentication information obtained from UDR 128 in step 6. Step 8 may be achieved by computing a distance between the current location of the UE and the location of the last authentication, computing a time difference between the current time and the time of the last authentication, and determining whether the distance is above an operator-defined threshold for the time difference. If the distance is greater than the operator-defined threshold, hSEPP 126B may determine that the message fails the location and velocity check. If the distance is less than the operator-defined threshold, hSEPP 126B may determine that the message passes the location and velocity check.

In step 9A, if hSEPP 126B determines that the authentication message is not within the allowed timeline, hSEPP 126B blocks the message and sends a response message, such as a 403 Forbidden response, to the originator of the authentication request message. If hSEPP 126B determines that the authentication message is within the allowed timeline, in step 9B, hSEPP 126B sends the message to AUSF 112. AUSF 112 then signals with UDM 104 to obtain authentication information for the UE. In step 10, AUSF 112 sends the authentication response to hSEPP 126B. In step 11, hSEPP 126B sends the authentication response to the originator of the authentication request.

Figure 6:
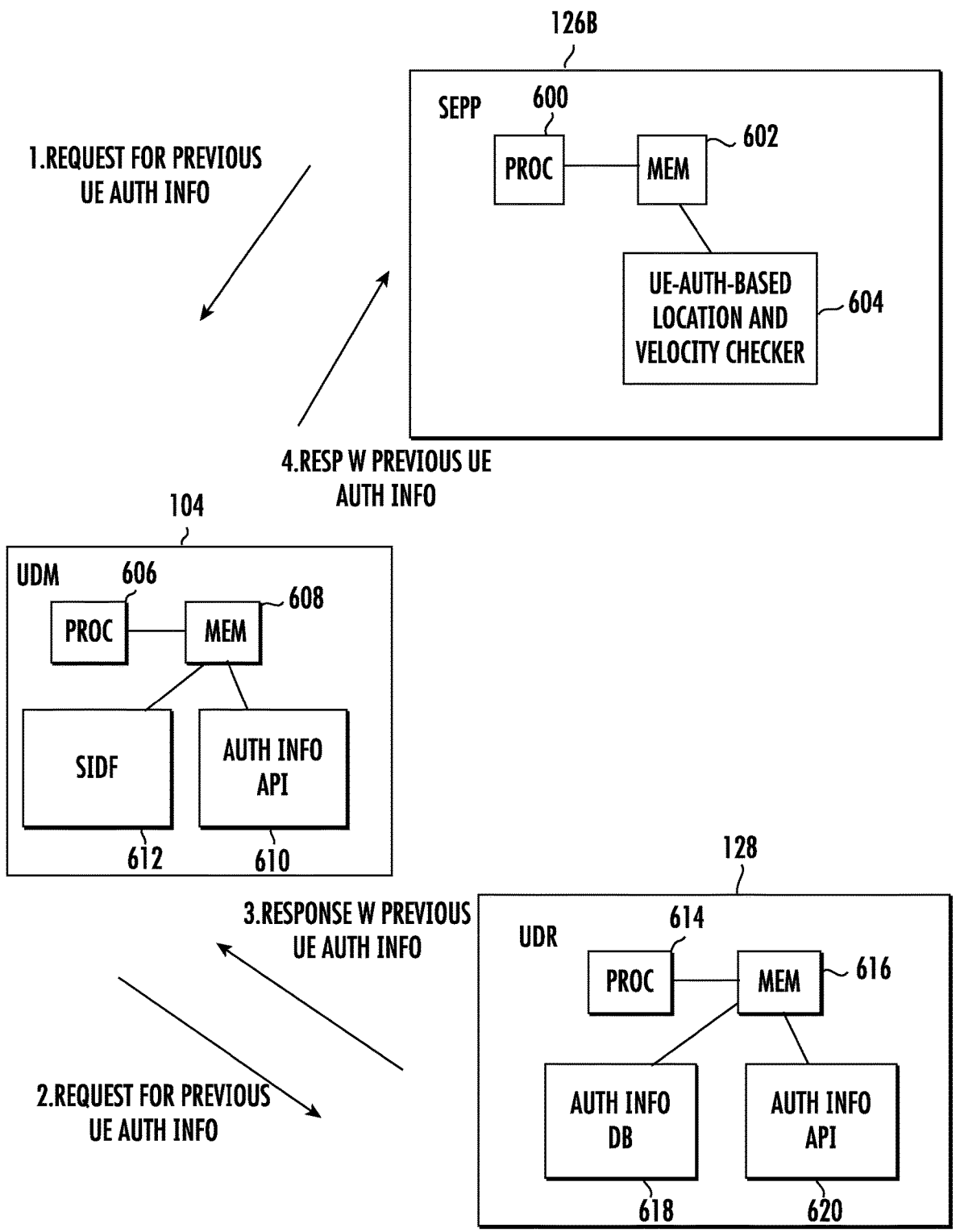
FIG. 6 is a block diagram illustrating an exemplary architecture for an SEPP, a UDM, and a UDR to allow the SEPP to perform a location and velocity check using UE authentication information.

FIG. 6 is a block diagram illustrating an exemplary architecture for an SEPP, a UDM, and a UDR to allow the SEPP to perform a location and velocity check using UE authentication information. Referring to FIG. 6, hSEPP 126B includes at least one processor 600 and memory 602. hSEPP 126B also includes a UE-authentication-based location and velocity checker 604 that may be implemented using computer executable instructions stored in memory 602 and executed by processor 600. UE-authentication-based location and velocity checker 604 may perform the steps described herein for conducting location and velocity checks at the SEPP using authentication information obtained from a UDR, either directly or via a UDM.

UDM 104 includes at least one processor 606 and memory 608. UDM 104 includes an authentication information application programming interface (API) 610 that allows other nodes to request authentication from UDR 128 via UDM 104. Authentication information API 610 may be configured to receive HTTP GET messages of the form illustrated in step 2 of FIGS. 4 and 5, forward those messages to UDR 128, receive responses from UDR 128, and forward the responses to hSEPP 126B. UDM 104 may also include an SIDF 612 for de-concealing SUCIs in received authentication request messages.

UDR 128 includes at least one processor 614 and memory 616. UDR further includes an authentication information database 618 that stores UE authentication information. For example, if UDR 128 receives a message triggered by an Nausf_UE_Authentication_Authenticate request message from AUSF 112 or UDM 104, UDR 128 may store in a record in database 618 the time of receipt of the message as the last authentication time of the UE. UDR 128 may also store in the record in database 618 the serving network name from the message triggered by the Nausf_UE_Authentication_Authenticate request message as the last network from which the UE authenticated. Table 1 shown below illustrates an example of last known update information that may be stored in database 618 for two UEs, UE1 and UE2.

TABLE 1

Last Authentication Information stored for UE1 and UE2

| UE Identifier | Last Authentication Time | Serving Network of Last Authentication |
|---|---|---|
| GUTI or SUPI for UE1 | 2300.01 | PLMNID1 or TAI1 |
| GUTI or SUPI for UE2 | 2300.50 | PLMNID2 or TAI2 |

From Table 1, last authentication information is stored for UE1 and UE2. Each row in Table 1 corresponds to a database record in database 618. The database records are each indexed by a subscriber identifier, such as a globally unique temporary identifier (GUTI) or a subscription permanent identifier (SUPI). This database record also includes the time and place of the last authentication, which can be queried and used by hSEPP 126B for location and velocity checks. For example, when hSEPP 126B receives a new authentication request message, hSEPP 126B may determine the time of receipt of the authentication request message, hSEPP 126B may also read the PLMN ID and/or TAI and the GUTI or SUPI from the authentication request message, hSEPP 126B may then determine the distance between the current network of the UE and the network from which the UE last authenticated recorded by the UDR, hSEPP 126B then subtracts the time of the authentication from the current time, hSEPP 126B may then compute UE velocity as follows:

UE velocity=Distance between current location and location of last authentication/Difference between current time and time of last authentication Once hSEPP 126B determines the UE velocity, hSEPP 126B may compare the velocity to an operator-defined velocity threshold. For example, the network operator may set a velocity threshold to 500 mph to account for air travel between UE locations. If the calculated UE velocity is less than the operator-defined threshold, hSEPP 126B may allow the message into the network. If the calculated velocity is greater than the operator-defined velocity threshold, hSEPP 126B may perform a network security action, including blocking the message from entering the network, blocking a sender of the message, and/or notifying the network operator.

In another example, hSEPP 126B may perform the location and velocity check for a received SBI request by determining whether network identification information a received SBI request message is appropriate for the device type. For example, if the device type is a stationary sensor, and the last authentication of the sensor originated from the home network of the UE, hSEPP 126B may block an authentication request message for the sensor that originates from outside of the home network.

Figure 7:
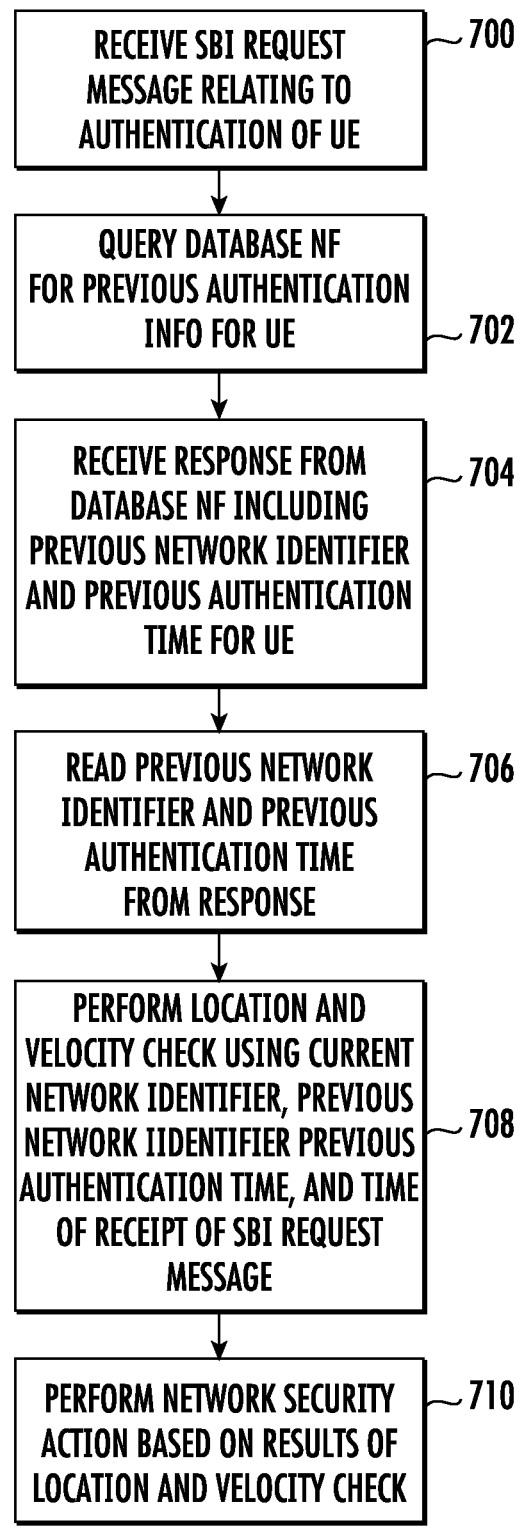
FIG. 7 is a flow chart illustrating an exemplary process for performing a location and velocity check at an SEPP using authentication information received from a UDR directly or from the UDR via a UDM.

FIG. 7 is a flow chart illustrating an exemplary process for performing a location and velocity check at an SEPP using authentication information received from a UDR, either directly or via a UDM. Referring to FIG. 7, in step 700, the process includes receiving, at an SEPP, an SBI request message relating to authentication of a user equipment (UE). Example, the SBI request message may be an Nausf_UE_Authentication_Authenticate request message.

In step 702, the process includes querying, by the SEPP, a database NF to obtain previous authentication information for the UE. For example, hSEPP 126B may query UDR 128, either directly or via UDM 104, for the previous authentication information for the UE using the API provided by UDM 104 or UDR 128. The previous authentication information may include the last time the UE was authenticated with the network and the identity of the network to which the UE was attached at the time of the last authentication.

In step 704, the process includes receiving, at the SEPP, a response from the database NF, the response including the previous authentication information for the UE. For example, hSEPP 126B may receive a response from UDM 104 or UDR 128 including the previous authentication information for the UE, such information including the previous authentication time for the UE and the identifier of the network to which the UE was attached at the time of the last authentication.

In step 706, the process includes reading, by the SEPP and from the response, the previous network identifier, and the previous authentication time. For example, hSEPP 126B may read a PLMN ID or other network identifier and the previous authentication time from the response message received from UDM 104 or UDR 128.

In step 708, the process includes performing, by the SEPP and using the current network identifier, the previous network identifier, the current authentication time and the previous authentication time, a location and velocity check for the UE. In one example, performing the location and velocity check may include determining whether the action associated with the SBI request is within allowed timelines, as described above.

In step 710, the process includes performing a network security action based on results of the location and velocity check. For example, if the received message fails the location and velocity check, the network security action may include blocking the message, blocking a sender of the message, and/or alerting the network operator. If the message passes the location and velocity check, the network security action may include forwarding the message to its intended destination.

Figure 8:
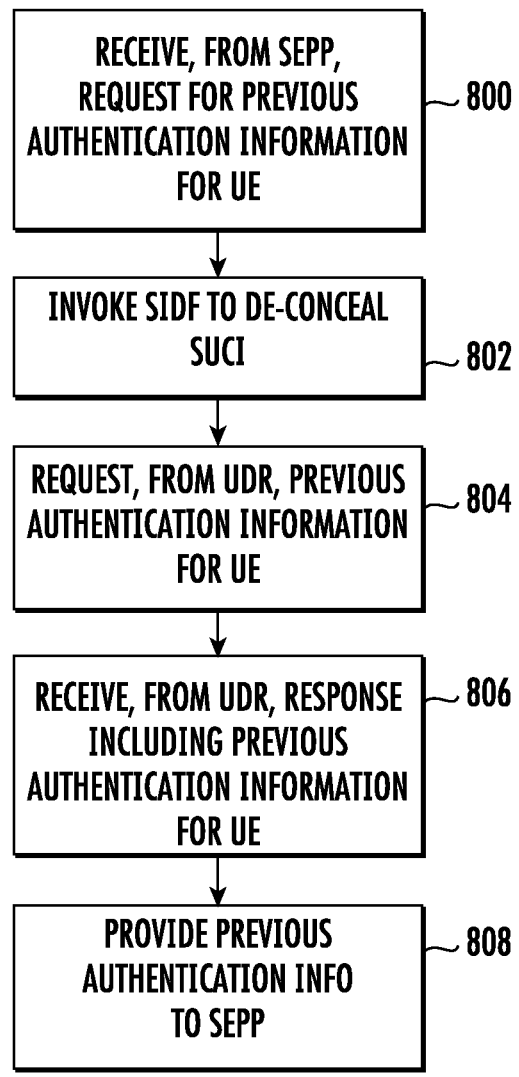
FIG. 8 is a flow chart illustrating an exemplary process performed by a UDM for making authentication information accessible to the SEPP for location and velocity checks.

FIG. 8 is a flow chart illustrating an exemplary process performed by a UDM for making authentication information accessible to the SEPP for location and velocity checks. Referring to FIG. 8, in step 800, the process includes receiving, from the SEPP, a request for previous authentication information for a UE. For example, UDM 104 may receive an HTTP GET request from hSEPP 126B requesting previous authentication information for a UE. In step 802, the process includes invoking SIDF to de-conceal the SUCI. Step 802 is optional and is only performed if the request includes a SUCI. If the request includes a SUPI, step 802 can be omitted. In step 804, the process includes requesting, from the UDR, previous authentication information for the UE. For example, UDM 104 may either forward the request received from the SEPP to UDR 128 or generate a new request in a different format expected by UDR 128 for queries for previous authentication information. In step 806, the process includes receiving, from the UDR, a response including previous authentication information for the UE. For example, UDM 104 may receive a response from UDR 128 where the response includes a previous authentication time and an identifier of previous network to which the UE was attached when the UE last authenticated. In step 808, the process includes providing the previous authentication information to the SEPP. For example, UDM 104 may respond to the query in step 800 according to the format expected by the SEPP. The response may include the previous authentication time and network identifier of the network serving the UE at the time of the last authentication of the UE.

Figure 9:
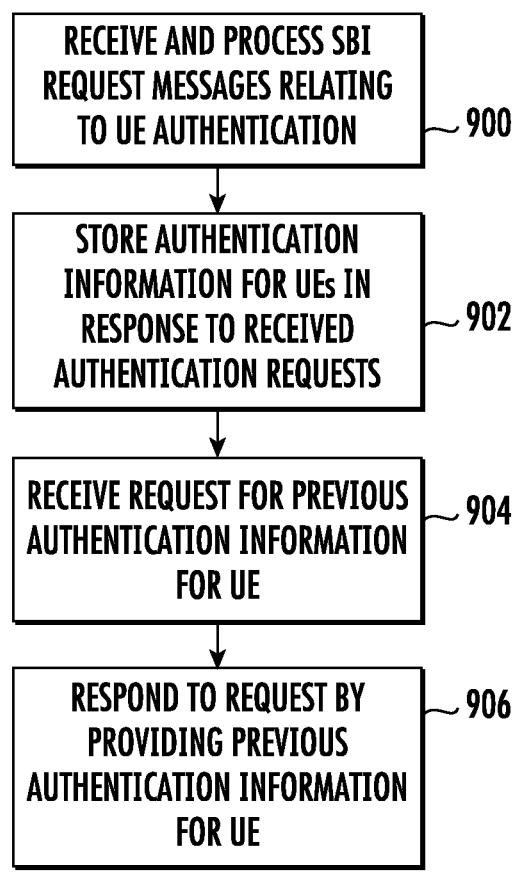
FIG. 9 is a flow chart illustrating an exemplary process performed by a UDR for making authentication information accessible to the SEPP for location and velocity checks.

FIG. 9 is a flow chart illustrating an exemplary process performed by a UDR for making authentication information accessible to the SEPP for location and velocity checks. Referring to FIG. 9, in step 900, the process includes receiving and processing SBI request messages relating to UE authentication. For example, UDR 128 may receive and process messages from AUSF 112 in response to Nausf_UEAuthentication_Authenticate request messages for UEs received by AUSF 112. The need for AUSF 112 or UDR 128 to perform security screening for such messages is reduced based on the security screening performed by hSEPP 126B. In step 902, the process includes storing authentication information for UEs in response to the received authentication request messages. For example, UDR 128 may store authentication times and network identifiers from the messages received from AUSF 112 when AUSF 112 receives Nausf_UEAuthentication_Authenticate request messages. In step 906, the process includes receiving a request for previous authentication information for a UE. For example, UDR 128 may receive, via the previous authentication information request API provided by UDR 128 for SEPP-originated authentication information requests, a request from an SEPP for previous authentication information concerning the UE. In step 906, the process includes responding to the request by providing previous authentication information for the UE. For example, UDR 128 may respond to queries from SEPP h126B for previous authentication information for UEs.

Advantages of the subject matter described herein include enhanced security at the edge of the network. Using the subject matter described herein, the UE can reduce the likelihood of successful spoofing attacks by performing the location and velocity check at the beginning of a UE's association with a network, i.e., during authentication, rather than after a UE has authenticated with the network, as described in GSMA FS-36. Performing the location and velocity check using information from the UDR is also believed to be advantageous, because the UDR is the 3GPP-defined repository for UE authentication information.

The disclosure of each of the following references is hereby incorporated herein by reference in its entirety.

REFERENCES

1. $3^{rd}$ Generation Partnership Project; Technical Specification Group Services and System Aspects for the 5G System (5GS); Stage 2; (Release 17) 3GPP TS 23.501 V17.7.0 (2022-12)
2. $3^{rd}$ Generation Partnership Project; Technical Specification Group Services and System Aspects; Procedures for the 5G System (5GS); Stage 2 (Release 17) 3GPP TS 23.502 V17.7.0 (2022-12)
3. $3^{rd}$ Generation Partnership Project; Technical Specification Group Core Network and Terminals; 5G System; Network Function Repository Services; Stage 3 (Release 18) 3GPP TS 29.510 V18.1.0 (2022-12)
4. $3^{rd}$ Generation Partnership Project; Technical Specification Group Core Network and Terminals; 5G System; Technical Realization of Service Based Architecture; Stage 3 (Release 18) 3GPP TS 29.500 V18.0.0 (2022-12)
5. $3^{rd}$ Generation Partnership Project; Technical Specification Group Core Network and Terminals; 5G System; Principles and Guidelines for Services Definition; Stage 3 (Release 18) 3GPP TS 29.501 V18.0.0 (2022-12)
6. $3^{rd}$ Generation Partnership Project; Technical Specification Group Services and System Aspects; Security architecture and procedures for 5G system (Release 18) 3GPP TS 33.501 V18.0.0 (2022-12)
7. 5G Interconnect Security, GSMA FS-36, Version 2.0, 3 Jun. 2021.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing a location and velocity check at a security edge protection proxy (SEPP) to protect against a spoofing attack, the method comprising:
   receiving, at an SEPP, a service-based interface (SBI) request message relating to authentication of a user equipment (UE);
   querying, by the SEPP, a database network function (NF) to obtain previous authentication information for the UE, the previous authentication information including a previous network identifier and a previous authentication time for the UE;
   receiving, at the SEPP, a response from the database NF, the response including the previous network identifier and the previous authentication time;

reading, by the SEPP, a current network identifier from the SBI request message;

performing, by the SEPP and using the current network identifier from the SBI request message, the previous network identifier, the previous authentication time, and a time of receipt by the SEPP of the SBI request message, a location and velocity check for the UE; and performing a network security action for the SBI request message based on results of the location and velocity check.

2. The method of claim 1 wherein receiving the SBI request message relating to authentication of a UE includes receiving an Nausf_UEauthentication message.

3. The method of claim 1 wherein querying the database NF includes transmitting an authentication information query message to a unified data repository (UDR) using an application programming interface (API) provided by the UDR for previous authentication information queries from the SEPP.

4. The method of claim 1 wherein querying the database NF includes transmitting an authentication information query message to a unified data management function (UDM) using an application programming interface (API) provided by the UDM for previous authentication information queries from the SEPP.

5. The method of claim 4 comprising, at the UDM, receiving the authentication information query message and querying a unified data repository (UDR) for the previous authentication information for the UE.

6. The method of claim 5 comprising, at the UDM, determining that the authentication information query message includes a subscription concealed identifier (SUCI), and, in response, prior to querying the UDR, invoking a subscription identifier de-concealing function (SIDF) to de-conceal the SUCI.

7. The method of claim 1 wherein reading the current network identifier from the SBI request message includes reading a public land mobile network (PLMN) ID from the SBI request message.

8. The method of claim 1 wherein performing the location and velocity check includes determining whether a distance between a previous network identified by the previous network identifier and a current network identified by the current network identifier could have been traveled by the UE in light of a time difference between the previous authentication time and the time of receipt of the SBI request message.

9. The method of claim 8 wherein performing the network security action includes blocking the SBI request message in response to determining that the distance could not have been traveled by the UE.

10. The method of claim 8 wherein performing the network security action includes blocking future messages from a sender of the SBI request message in response to determining that the distance could not have been traveled by the UE.

11. The method of claim 4 wherein the UDM queries a unified data repository (UDR) for the previous authentication information for the UE, the UDR provides the previous authentication information for the UE to the UDM, and the response received by the SEPP is from the UDM.

12. A system for performing a location and velocity check at a security edge protection proxy (SEPP) to protect against a spoofing attack, the system comprising:

an SEPP including at least one processor and a memory;
a user equipment (UE)-authentication-based location and velocity checker implemented by the at least one processor for receiving a service based interface (SBI) request message relating to authentication of a UE, querying a database network function (NF) to obtain previous authentication information for the UE, the previous authentication information including a previous network identifier and a previous authentication time for the UE, the UE-authentication-based location and velocity checker for receiving a response from the database NF, the response including the previous network identifier and the previous authentication time, reading, by the SEPP, a current network identifier from the SBI request message, performing, using the current network identifier from the SBI request message, the previous network identifier, the previous authentication time, and a time of receipt by the SEPP of the SBI request message, a location and velocity check for the UE, and performing a network security action for the SBI request message based on results of the location and velocity check.

13. The system of claim 12 wherein the SBI request message relating to authentication of a UE includes an Nausf_UEauthentication message.

14. The system of claim 12 wherein, in querying the database NF, the UE-authentication-based location and velocity checker is configured to transmit an authentication information query message to a unified data repository (UDR) using an application programming interface (API) provided by the UDR for previous authentication information queries from the SEPP.

15. The system of claim 12 wherein, in querying the database NF, the UE-authentication-based location and velocity checker is configured to transmit an authentication information query message to a unified data management function (UDM) using an application programming interface (API) provided by the UDM for previous authentication information queries from the SEPP.

16. The system of claim 12 wherein the current network identifier includes a public land mobile network (PLMN) ID.

17. The system of claim 12 wherein, in performing the location and velocity check, the UE-authentication-based location and velocity checker is configured to determine whether a distance between a previous network identified by the previous network identifier and a current network identified by the current network identifier could have been traveled by the UE in light of a time difference between the previous authentication time and the time of receipt of the SBI request message.

18. The system of claim 17 wherein the network security action includes blocking the SBI request message in response to determining that the distance could not have been traveled by the UE.

19. The system of claim 17 wherein the network security action includes blocking future messages from a sender of the SBI request message in response to determining that the distance could not have been traveled by the UE.

20. A non-transitory computer readable medium having stored thereon executable instructions that when executed by a processor of a computer control the computer to perform steps comprising:

receiving, at a security edge protection proxy (SEPP), a service-based interface (SBI) request message relating to authentication of a user equipment (UE);

querying, by the SEPP, a database network function (NF) to obtain previous authentication information for the UE, the previous authentication information including a previous network identifier and a previous authentication time for the UE;

receiving, at the SEPP, a response from the database NF, the response including the previous network identifier and the previous authentication time;

reading, by the SEPP, a current network identifier from the SBI request message;

performing, by the SEPP and using the current network identifier from the SBI request message, the previous network identifier, the previous authentication time, and a time of receipt by the SEPP of the SBI request message, a location and velocity check for the UE; and performing a network security action for the SBI request message based on results of the location and velocity check.

\* \* \* \* \*

UNITED STATES PATENT AND TRADEMARK OFFICE
CERTIFICATE OF CORRECTION

PATENT NO. : 12,262,208 B2  
APPLICATION NO. : 18/135105  
DATED : March 25, 2025  
INVENTOR(S) : Sharma et al.

Page 1 of 1

It is certified that error appears in the above-identified patent and that said Letters Patent is hereby corrected as shown below:

In the Specification

In Column 11, Line 61, delete "message," and insert -- message. --, therefor.

In Column 11, Line 65, delete "message," and insert -- message. --, therefor.

In Column 11, Line 67, delete "UDR," and insert -- UDR. --, therefor.

In Column 12, Line 2, delete "time," and insert -- time. --, therefor.

Signed and Sealed this  
Seventeenth Day of June, 2025

Coke Morgan Stewart  
*Acting Director of the United States Patent and Trademark Office*